US007568096B2

(12) United States Patent
Evans et al.

(10) Patent No.: US 7,568,096 B2
(45) Date of Patent: Jul. 28, 2009

(54) RENDERING DIGITAL CONTENT IN A CONTENT PROTECTION SYSTEM ACCORDING TO A PLURALITY OF CHAINED DIGITAL LICENSES

(75) Inventors: Brian P. Evans, Redmond, WA (US); Clifford P. Strom, Sammamish, WA (US); Michael Jay Parks, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 843 days.

(21) Appl. No.: 10/831,281

(22) Filed: Apr. 23, 2004

(65) Prior Publication Data

US 2005/0251487 A1 Nov. 10, 2005

(51) Int. Cl.
*H04L 9/00* (2006.01)
(52) U.S. Cl. .......................... 713/157; 726/18
(58) Field of Classification Search ................. 713/150, 713/155–159, 173, 175, 182–186, 188–189; 726/1–8, 10, 17–19, 21, 27, 30; 705/58, 705/67, 76; 709/203, 229, 220–221, 223–225, 709/246
See application file for complete search history.

(56) References Cited

U.S. PATENT DOCUMENTS

| | | | | |
|---|---|---|---|---|
| 5,553,143 | A * | 9/1996 | Ross et al. ...................... 705/59 |
| 6,105,069 | A * | 8/2000 | Franklin et al. ............. 709/229 |
| 6,335,972 | B1 * | 1/2002 | Chandersekaran et al. .. 380/286 |
| 6,898,286 | B2 * | 5/2005 | Murray ........................ 380/202 |
| 6,959,291 | B1 * | 10/2005 | Armstrong et al. ............ 705/59 |
| 6,976,163 | B1 * | 12/2005 | Hind et al. ................... 713/156 |
| 7,055,169 | B2 * | 5/2006 | Delpuch et al. ............. 725/100 |
| 7,073,056 | B2 * | 7/2006 | Kocher ....................... 713/156 |
| 7,080,039 | B1 * | 7/2006 | Marsh ......................... 705/51 |
| 7,200,760 | B2 * | 4/2007 | Riebe et al. .................. 713/194 |

(Continued)

FOREIGN PATENT DOCUMENTS

EP 1 376 307 A2 1/2004

(Continued)

OTHER PUBLICATIONS

Housley, r. et al., "Internet X.509 Public Key Infrastructure Certificate and Certificate Revocation List (CRL) Profile", *Standards Track*, Apr. 2002, 1-91, XP-002279343.

*Primary Examiner*—Kimyen Vu
*Assistant Examiner*—Leynna T Truvan
(74) *Attorney, Agent, or Firm*—Woodcock Washburn LLP

(57) ABSTRACT

A request to render encrypted content is received and a chain of licenses corresponding to the content is located. The chain includes a leaf license linked to the content at one end of the chain, a root license at the other end of the chain, and any intermediate licenses therebetween. The leaf license and any intermediate licenses in the chain are each bound to the adjoining license in the chain toward the root license, and the root license is bound to an owner of a private key (PR-U). For each license in the chain, the license is verified and it is confirmed that the license allows the content to be rendered. A decryption key is obtained from the leaf license based on application of (PR-U) to the root license, the obtained key is applied to decrypt the encrypted content, and the decrypted content is rendered.

7 Claims, 5 Drawing Sheets

U.S. PATENT DOCUMENTS

| | | | |
|---|---|---|---|
| 7,216,368 B2 * | 5/2007 | Ishiguro | 726/32 |
| 7,224,805 B2 * | 5/2007 | Hurst et al. | 380/285 |
| 7,260,721 B2 * | 8/2007 | Tanaka et al. | 713/170 |
| 7,278,165 B2 * | 10/2007 | Molaro | 726/27 |
| 7,315,941 B2 * | 1/2008 | Ramzan et al. | 713/156 |
| 7,336,791 B2 * | 2/2008 | Ishiguro | 380/278 |
| 2003/0053630 A1 | 3/2003 | Elliot et al. | 380/277 |
| 2005/0138388 A1 * | 6/2005 | Paganetti et al. | 713/185 |

FOREIGN PATENT DOCUMENTS

EP      1 477 879 A2     11/2004

* cited by examiner

RENDERING DIGITAL CONTENT IN A CONTENT PROTECTION SYSTEM ACCORDING TO A PLURALITY OF CHAINED DIGITAL LICENSES

TECHNICAL FIELD

The present invention relates to an architecture and method for allowing digital content to be rendered in a content protection system according to a plurality of chained digital licenses, where each license in the chain must be satisfied to in fact render the content. More particularly, the present invention relates to such an architecture and method whereby the content and the licenses in the chain include appropriate references to each other.

BACKGROUND OF THE INVENTION

As is known, and referring now to FIG. 1, a content protection and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A copy protection system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based copy protection system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 and/or rules may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the copy protection system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the copy protection system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that rules in the license 16 are satisfied, the digital content 12 can then be rendered. In particular, to render the content 12, the decryption key (KD) is obtained from a pre-defined source such as the aforementioned license 16 and is applied to (KD(CONTENT)) from the content package 13 to result in the actual content 12, and the actual content 12 is then in fact rendered.

Note that the trusted component 18 may at times be required to maintain state information relevant to the rendering of a particular piece of content 12 and/or the use of a particular license 16. For example, it may be the case that a particular license 16 has a play count requirement, and accordingly the trusted component 18 must remember how many times the license 16 has been employed to render corresponding content 12 or how many more times the license 16 may be employed to render the corresponding content 12. Accordingly, the trusted component 18 may also include at least one persistent secure store 22 within which such state information is persistently maintained in a secure manner. Thus, the trusted component 18 stores such state information in such secure store 22 in a persistent manner so that such state information is maintained even across sessions of use on the computing device 14. Such secure store 22 is likely located on the computing device 14 of the trusted component 18, although such secure store 22 may alternately be located elsewhere.

In a copy protection system 10, content 12 is packaged for use by a user by encrypting such content 12 and associating a set of rules with the content 12, whereby the content 12 can be rendered only in accordance with the rules. Because the content 12 can only be rendered in accordance with the rules, then, the content 12 may be freely distributed. Typically, the content 12 is encrypted according to a symmetric key such as the aforementioned key (KD) to result in (KD(content)), and (KD(content)) therefore is also decrypted according to (KD) to result in the content 12. Such (KD) is in turn included within the license 16 corresponding to the content 12. Oftentimes, such (KD) is encrypted according to a public key such as the public key of the computing device 14 (PU-C) upon which the content 12 is to be rendered, resulting in (PU-C (KD)). Note, though, that other public keys may be employed, such as for example a public key of a user, a public key of a group of which the user is a member, etc.

Only a single license 16 has heretofore been required to render corresponding content 12. Such single license 16 is typically bound to a single user, a single machine, a single group of users, or the like, as represented by the public key encrypting (KD) within such license. Correspondingly, only a possessor of the private key corresponding to such public key can access (KD), presuming of course that a trusted component 18 so allows. However, it is to be appreciated that instances exist where it may be advantageous to require multiple licenses 16 to render such content 12.

For one example, one of the multiple licenses 16 may specify a first of two portions of the rules for rendering the content 12 and another of the multiple licenses 16 may specify a second of the two portions of the rules for rendering the content 12. For another example, by requiring multiple licenses 16 to render content 12, a license 16 could be bound to one or more other licenses 16, thus forming a sequence or 'chain' of linked or 'chained' licenses 16 leading to a root license 16. In such a situation, and as should be appreciated, the rules in each chained license 16 must be satisfied to allow corresponding content 12 to be rendered.

Note, though, that no architecture or method exists for defining how to bind a chained license 16 to another chained license 16, how to traverse from one chained license 16 to the next, or how to employ a chain of licenses 16 to render content 12. Accordingly, a need exists for an architecture and method that effectuate binding a chained license 16 to another chained license 16, traversing from one chained license 16 to the next, and employing a chain of licenses 16 to render content 12, among other things.

SUMMARY OF THE INVENTION

The aforementioned needs are satisfied at least in part by the present invention in which a method is provided to render encrypted digital content on a computing device in accordance with a chain of licenses. In the method, a request to render the content is received and the chain of licenses corresponding to the content is located. The chain includes a leaf license linked to the content at one end of the chain, a root license at the other end of the chain, and any intermediate licenses therebetween. The leaf license and any intermediate licenses in the chain are each bound to the adjoining license in the chain toward the root license, and the root license is bound to an owner of a private key (PR-U).

For each license in the chain, the license is verified and it is confirmed that the license allows the content to be rendered. A cryptographic key for decrypting the content is obtained from the leaf license based on application of (PR-U) to the root license and decryption of chain keys within the chain, the obtained key is applied to the encrypted content to decrypt same, and the decrypted content is rendered.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
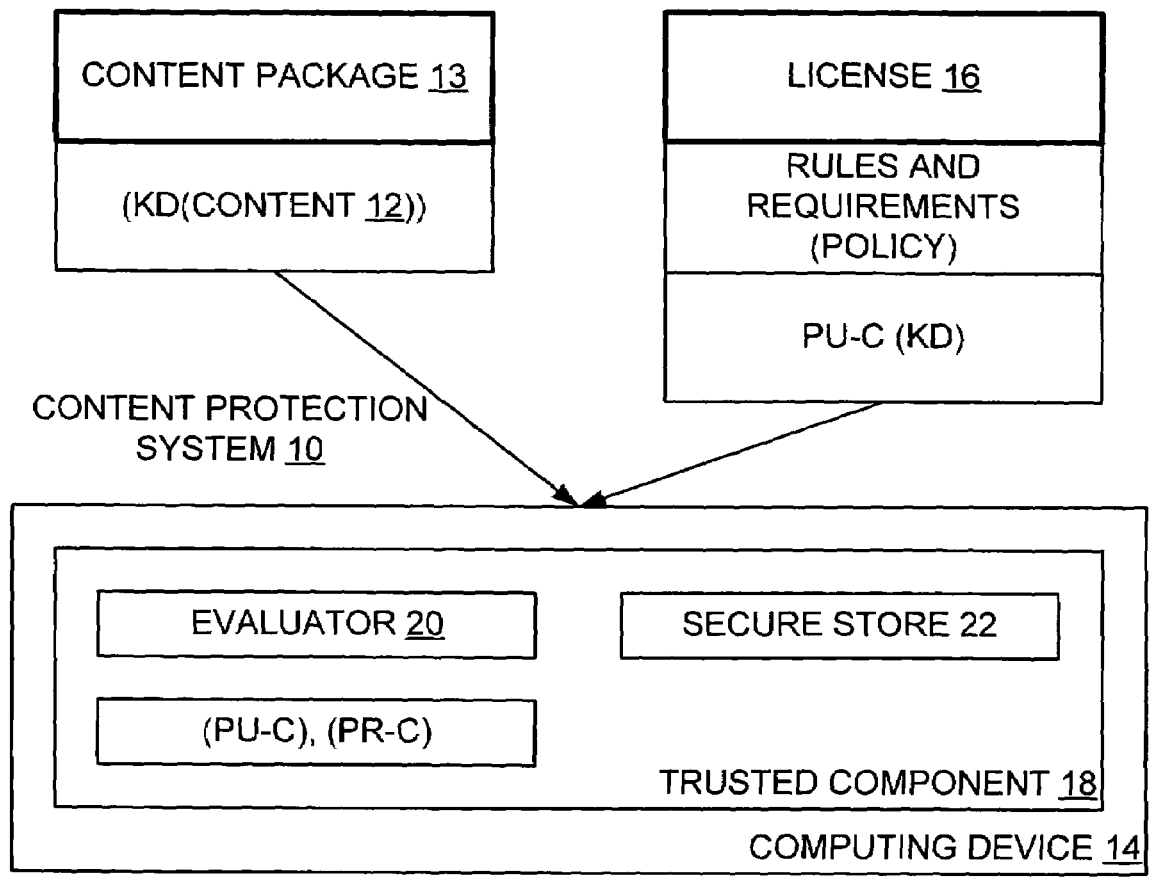
FIG. 1 is a block diagram showing an enforcement architecture of an example of a trust-based system, including a computing device with a trusted component for receiving a digital license corresponding to digital content and allowing rendering of the content only in accordance with the license.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
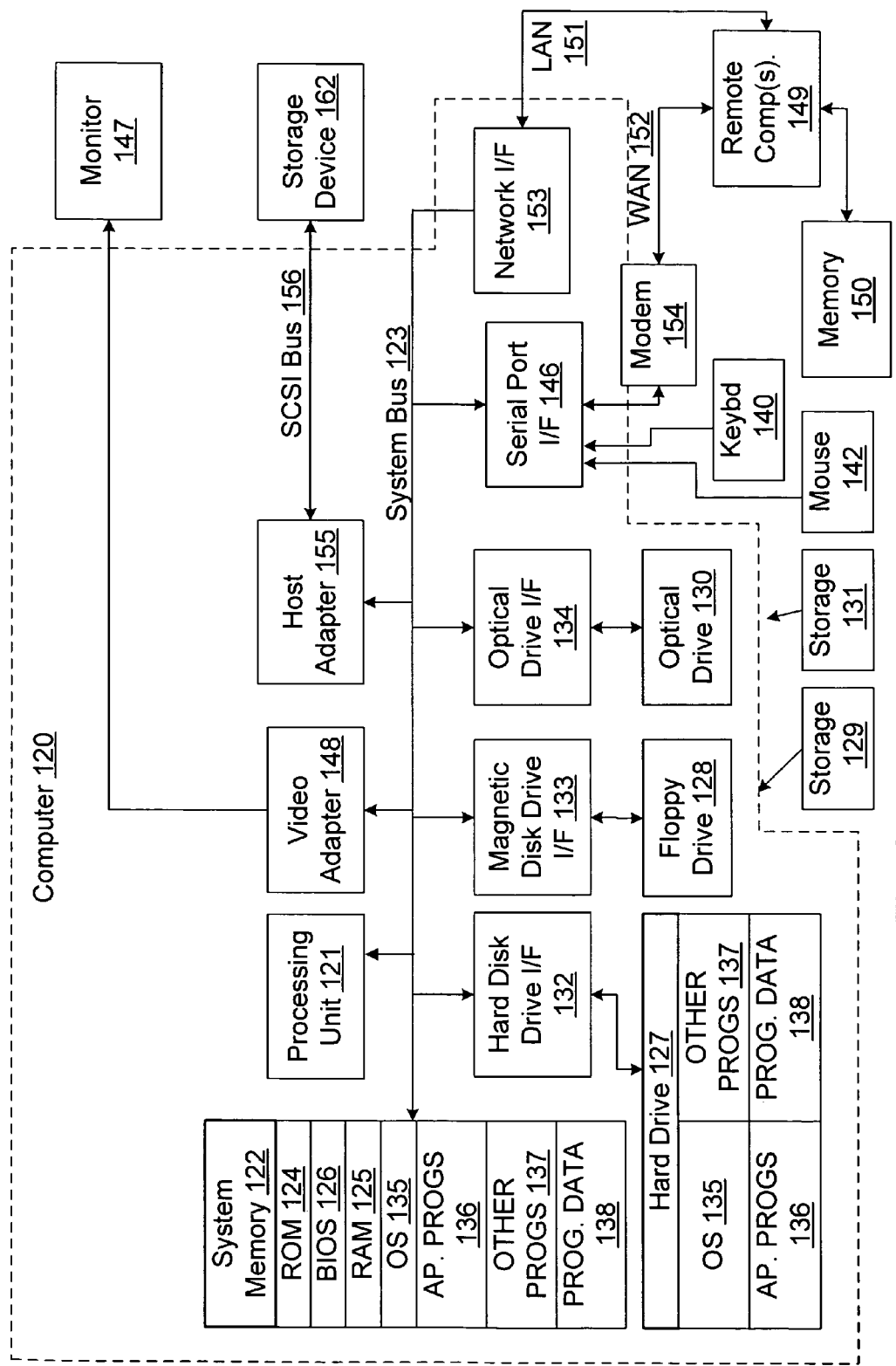
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Chained Licenses 16 and Use Thereof

In the present invention, content 12 may be accessed on a computing device 14 in accordance with a content protection system 10 that can process a sequence or 'chain' of linked or 'chained' licenses 16.

Figure 3:
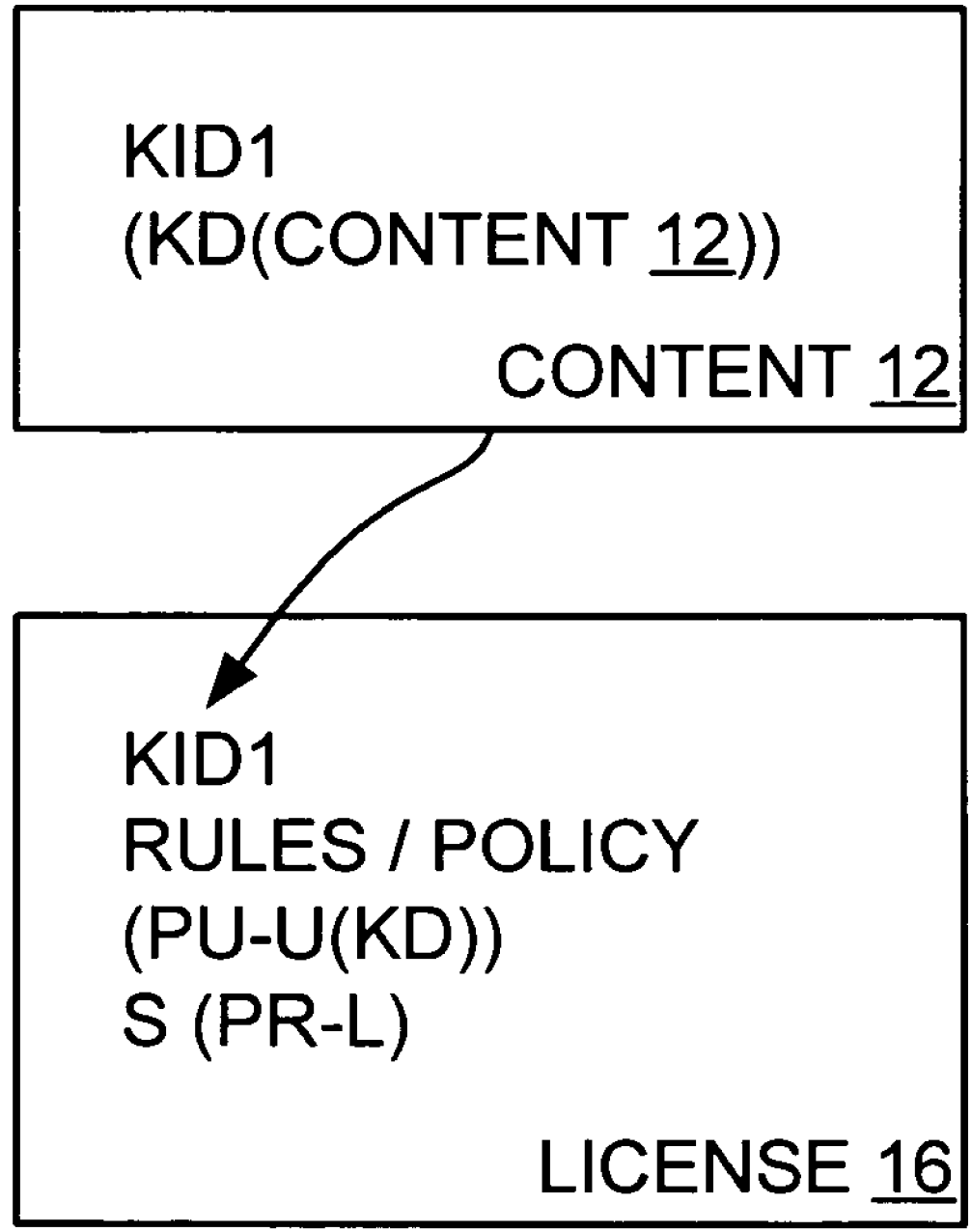
FIG. 3 is a block diagram showing the relationship between the digital content and the digital license of FIG. 1 when the digital license is un-chained.

Turning now to FIG. 3, it is seen that in the situation where a single, non-chained license 16 is bound to a single user, a single machine, a single group of users, or the like, a public key thereof (PU-U) encrypts (KD) within such license 16 to result in (PU-U(KD)). Thus only a possessor of the private key (PR-U) corresponding to such (PU-U) can access (KD) from such (PU-U(KD)), presuming of course that a trusted component 18 so allows. In practice, such a non-chained license 16 is employed in the following manner. Preliminarily, a user selects a content package 13 with a piece of content 12 corresponding to the license 16, where the content 12 in the package 13 is already encrypted according to a content key (KD) to result in (KD(content)). The package 13 also has a content ID or 'KID' that identifies the content 12 In at least some instances, such KID may represent a value from which the content key (KD) for decrypting the content 12 may be derived.

At any rate, such KID is included with the non-chained license 16, as is shown in FIG. 3, and the license 16 is presumably stored within a license store or the like (not shown) and is indexed within the license store according to the KID therein. Thus, upon selecting the content package 13 with the KID therein, the trusted component 18 may employ such KID to locate and select the license 16 in the license store.

Such license 16 presumably includes therewith a digital signature based on the contents of the license 16 and the private key of an issuer of the license (PR-L), and thus such signature may be verified by application of a corresponding public key of the issuer (PU-L) in a manner that should be known or apparent to the relevant public, where (PU-L) is presumably available to the trusted component 18. Accordingly, upon selecting the license 16, the trusted component 18 in fact verifies such signature, and in the event the verification is positive use of the license 16 to render the corresponding content 12 proceeds.

In particular, and as was set forth above, the license 16 also includes rules or policy that must be evaluated by the license evaluator 20 and satisfied prior to allowing the content 12 to be rendered. Thus, the license evaluator 20 in fact evaluates the rules in the license 16 to determine whether the rules allow the content 12 to be rendered in the manner sought. Presuming that the rules do in fact allow the content 12 to be rendered, then, the trusted component 18 locates (PU-U(KD)) as set forth in the license 16 and applies (PR-U) thereto to reveal (KD), where (PR-U) is presumably available to the trusted component. As should now be evident, the trusted component 18 can then apply (KD) to (KD(content)) from the content package 13 to reveal the content 12, and then forwards the revealed content 12 to an appropriate application (not shown) for rendering thereby.

Once again, the single, un-chained license 16 of FIG. 3 is directly bound to the user, machine, group of the user, etc. by way of using the public key (PU-U) thereof to encrypt the content key (KD), and accordingly no other licenses 16 are necessary to render the content 12 corresponding to such single license 16.

Figure 4:
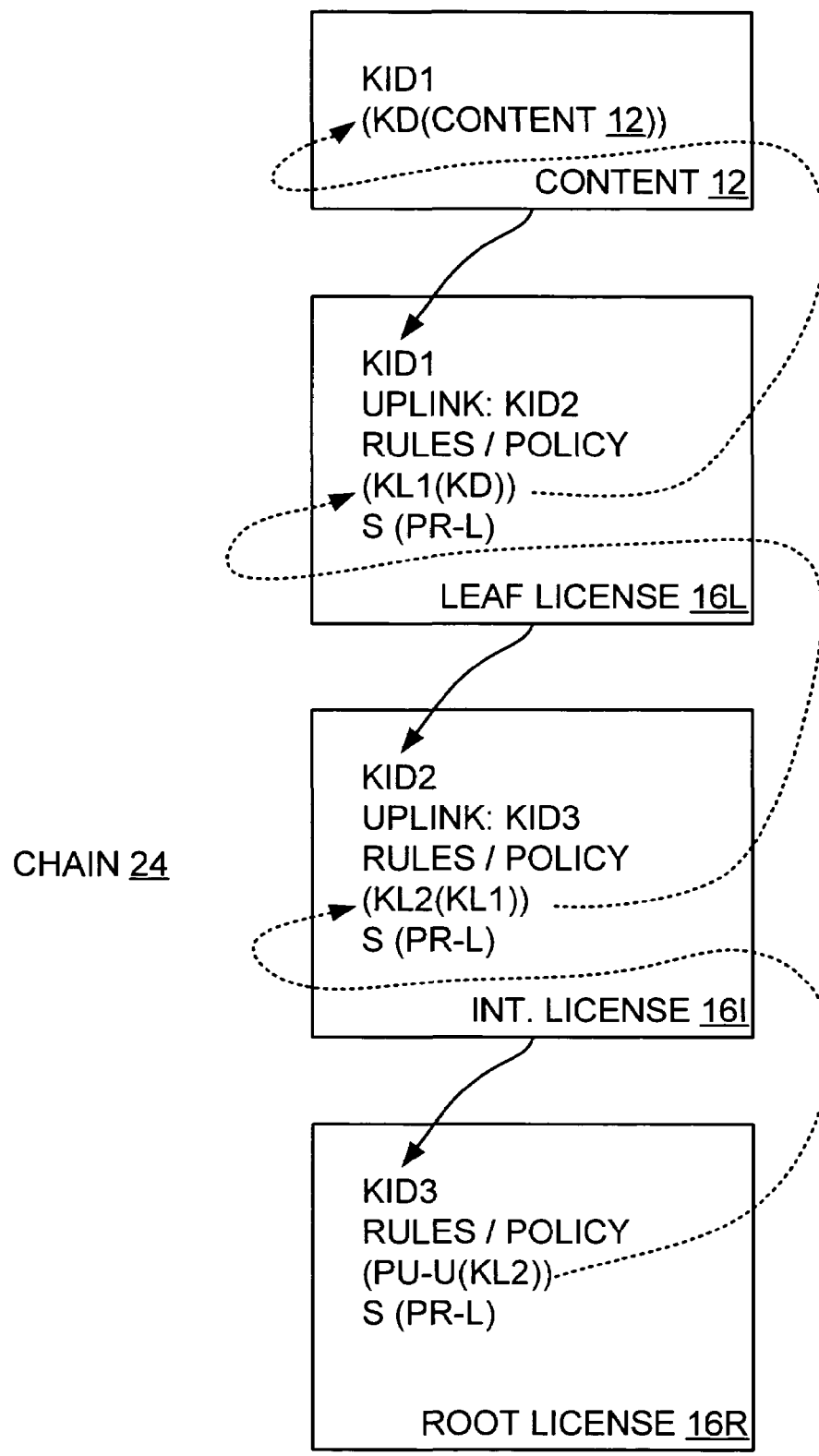
FIG. 4 is a block diagram showing the relationship between the digital content of FIG. 1 and a plurality of chained digital licenses in accordance with one embodiment of the present invention.

However, and turning now to FIG. 4, in one embodiment of the present invention, a chained license 16 is bound to another license 16 to form a chain 24 of such licenses 16, whereby each license 16 in the chain 24 must be present and verified and the rules in each 'chained' license 16 must be satisfied to allow corresponding content 12 to be rendered. In such embodiment, and as shown, such chain 24 includes:
- a 'leaf' license 16*l* with the KID of the corresponding content 12 (KID1, here);
- a 'root' license 16*r* that is bound to the user, machine, group of the user or the like by way of using the public key (PU-U) thereof to encrypt a value that must be decrypted; and
- zero, one, or more intermediate licenses 16*i* (one being shown in FIG. 4) interconnecting the leaf license 16*l* and the root license 16*r* to form the chain 24. As seen, and as with an un-chained license 16, each of the leaf license 16*l*, root license 16*r*, and any intermediate license 16*i* includes a KID (KID1, KID2, KID3, etc.), a set of rules, and a digital signature.

As also seen, the leaf license 16*l* and any intermediate licenses 16*i* in the chain 24 are distinguished from an un-chained license 16 in that each such license 16*l*, 16*i* additionally includes an uplink KID(x+1) pointing to the next license 16 in the chain 24 toward the root license 16*r*, be it an intermediate license 16*i* or the root license 16*r*. The leaf license 16*l* and any intermediate licenses 16*i* in the chain 24 are also distinguished from an un-chained license 16 in that the one cryptographic key encrypting the other cryptographic key is not (PU-U(KD)). Instead, in the case of the leaf license 16*l*, (KD) is encrypted according to a symmetric link key (KLx). As shown, such (KLx) is available from the next license 16 in the chain 24 toward the root license 16*r*. Similarly, in the case of any intermediate license 16*i*, a symmetric link key (KL(x−1)) to be employed in connection with the next license 16 in the chain 24 toward the leaf license 16*l* is encrypted according to another symmetric link key (KLx), where such another (KLx) is again available from the next license 16 in the chain 24 toward the root license 16*r*.

As further seen, the root license 16*r* in the chain 24 does not include any uplink KID(x+1), especially inasmuch as the root license 16*r* is at the end of the chain 24. Significantly, in the root license 16*r*, the one cryptographic key encrypting the other cryptographic key is not (PU-U(KD)), but instead is (PU-U) encrypting the symmetric link key (KL(x−1)) to be employed in connection with the next license 16 in the chain 24 toward the leaf license 16*l* (i.e. (PU-U(KL(x−1))).

As should now be appreciated, with the chain 24 of licenses 16 as thus far described, each license 16, be it a leaf license 16*l* or an intermediate license 16*i*, is chained to the next license 16 toward the root license 16*r* by including therein the uplink KID(x+1) for such next license 16. In addition, the root license 16*r* is bound to a user, machine, group of users, etc. by the (PU-U(KL(x−1))) therein. Correspondingly, each license 16, be it a root license 16*r* or an intermediate license 16*i*, is chained to the next license 16 toward the leaf license 16*l* by including therein the symmetric link key (KL(x−1)) for such next license 16. Finally, it is to be remembered that the leaf license 16*l* has the content key (KD) for decrypting the protected content 12.

As may now be appreciated, the chain 24 of licenses 16 as set forth in connection with FIG. 4 is employed by following the KID1 in a piece of content 12 to the leaf license 16*l* having such KID1, and then by following the uplink KID(x+1) (KID2, KID3, etc.) in each license 16 of the chain 14 until a root license 16*r* without such an uplink KID(x+1) is found. Thereafter, (PR-U) is applied to (PU-U(KL(x−1))) from the root license 16*r* to reveal the link key (KL(x−1)) for the next license 16 toward the leaf license 16*l*, and the chain 24 is traversed in the opposite direction, during which at each step a (KLx(KL(x−1))) is decrypted to reveal (KL(x−1)) if the license 16 is an intermediate license 16*i* or else a (KL1(KD)) is decrypted to reveal (KD) if the license 16 is the leaf license 16*l*.

Significantly, each license 16 in a particular chain 24 is evaluated independently regarding whether the digital signature thereof verifies and whether the rules thereof permit rendering of the content 12 in the manner sought. For a license chain 24 to enable content rendering, then, each license 16 must allow such rendering. State data in a secure state store 22 such as action counts are kept per license 16, and are handled independently for each license 16 in a chain 24. For example, if a root license 16*r* and leaf license 16*l* form a complete chain 24 for particular content 12 and each has a play count, both the play count for the root license 16*r* and the play count for the leaf license 16*l* are properly adjusted when the chain 24 is employed to render the content 12. If either play count would prevent the content 12 from being rendered, the content 12 is in fact not rendered, even if the other play count might in fact allow the content 12 to be rendered.

Figure 5:
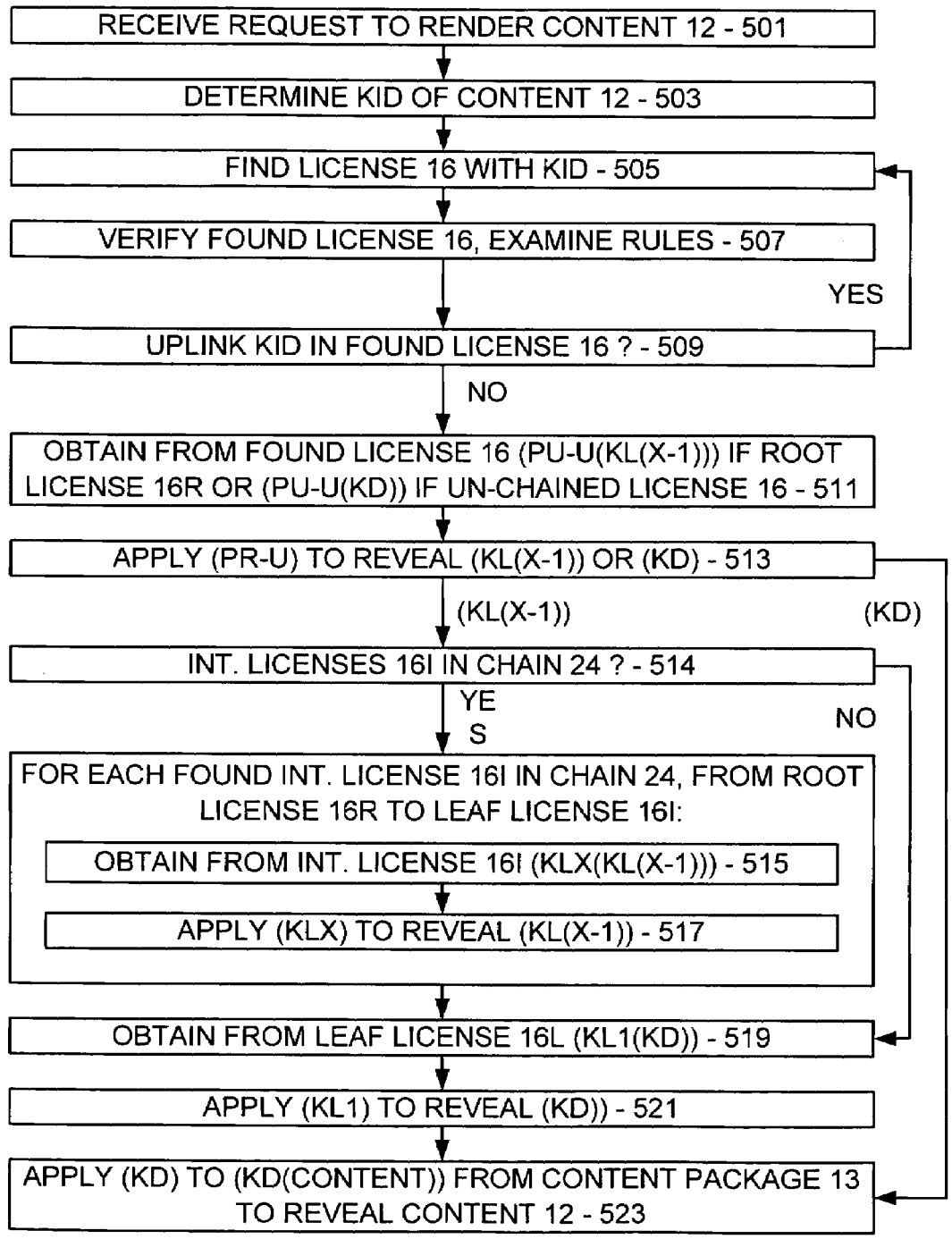
FIG. 5 is a flow diagram showing key steps performed by the trusted component of FIG. 1 in traversing the chain of FIG. 4 in the course of determining whether to allow the content to be rendered in accordance with one embodiment of the present invention.

Turning now to FIG. 5, a method for employing a chain 24 of licenses such as that shown in FIG. 4 is disclosed in more detail. Preliminarily, it is presumed that each license 16 in the chain 24 of FIG. 4 is present on a computing device 14 having content 12 that is to be rendered based on such chain 24, including a leaf license 16*l* with an uplink KID2 and a (KL1 (KD)); any intermediate license 16*i* with an uplink KID(x+1) (KID3, KID4, etc.) and a (KLx(KL(x−1))); and a root license 16*r* with a (PU-U(KL(x−1))).

Upon receiving a request that content 12 be rendered (step 501), then, a trusted component 18 on the computing device determines a KID1 associated with such content 12 (step 503), finds a license 16 in a license store on the computing device having such KID1 (step 505), and verifies such found license 16 and ensures that the rules of the found license 16 permit the rendering of the content 12 in the manner sought (step 507). Note that the trusted component 18 does not know as yet whether the found license 16 is a leaf license 16*l* or an un-chained license 16. Thus, presuming the found license 16 verifies and permits the rendering of the content 12, the trusted component 18 then determines whether the found license 16 has an uplink KID (KID2, here) (step 509). As should now be evident, if the found license 16 does not have an uplink KID2, such found license 16 is an un-chained license 16 and not a leaf license 16*l*, and processing of the un-chained license 16 proceeds as shown in FIG. 5 through steps 511, 513, and then 523.

However, and as should also now be evident, if the found license 16 in fact has an uplink KID2, such found license 16 is a leaf license 16*l*, and processing thus continues at step 505, where the trusted component finds a license 16 (an intermediate license 16*i* or a root license 16*r*) in a license store on the computing device having such (uplink) KID2, and verifies such found license 16 and ensures that the rules of the found license 16 permit the rendering of the content 12 in the manner sought, as at step 507. Note here that the trusted component 18 does not know as yet whether the found license 16 is an intermediate license 16*i* or a root license 16*r*. Thus, presuming the found license 16 verifies and permits the rendering of the content 12, the trusted component 18 again determines whether the found license 16 has an uplink KID (KID3, here), as at step 509. As should be evident here, if the found license 16 does not have an uplink KID3, such found license 16 is a root license 16*r*, and processing thus continues to step 511 (see below) where the chain 24 of licenses 16 is traversed back toward the leaf license 16*l*.

However, and as should also be evident here, if the found license 16 in fact has an uplink KID3, such found license 16 is an intermediate license 16*i*, and processing thus again continues at step 505. Thus, one or more intermediate licenses 16*i* are processed until a root license 16*r* is found by the absence of an uplink KID(x+1) therein at step 509.

Upon in fact determining that a found license 16 is a root license 16*r*, the trusted component 18 continues processing by obtaining from the found root license 16*r* the (PU-U(KL(x−1))) that is included therewith (step 511), and applying (PR-U) to such (PU-U(KL(x−1))) to reveal (KL(x−1)) (step 513). Note that the trusted component 128 is thus presumed to be in possession of such (PR-U). Note, too, that as was set forth above, the revealed (KL(x−1)) is to be employed with regard to the next license 16 toward the leaf license 16*l*. Note, further, that for the revealed (KL(x−1)) to be employed with regard to the next license 16 toward the leaf license 16*l*, the trusted component 18 should keep track of the licenses 16 in the chain 24 and their order therein as were found when traversing toward the root license 16*r*, either by way of keeping an appropriate list (not shown), or otherwise.

Thus, for each found intermediate license 16*i* in the chain 24, and in order from the root license 16*r* to the leaf license 16*l*, the trusted component 18 obtains from such intermediate license 16*i* the (KLx(KL(x−1))) that is included therewith (step 515), and applies (KLx) to such (KLx(KL(x−1))) to reveal (KL(x−1)) (step 517). As should now be appreciated, for any particular intermediate license 16*i*, the (KLx) to be applied to the (KLx(KL(x−1))) thereof is found from the next license 16 toward the root license 16*r*, be it such root license 16*r* or another intermediate license 16*i*.

Finally, after the trusted component 18 obtains (KL1) from the last intermediate license 16*i* toward the leaf license 16*l* as at step 517, such trusted component 18 then obtains from the leaf license 16*l* the (KL1(KD)) that is included therewith (step 519), applies (KL1) to such (KL1(KD)) to reveal (KD) (step 521), and applies (KD) to (KD(content)) from the content package 13 to reveal the content 12 (step 523).

Of course, if the chain 24 includes no intermediate license 16*i*, as is determined at step 514, the root license 16*r* includes (PU-U(KL1)) and the process continues from step 513 directly to step 519.

As should now be evident from FIG. 5, the processing of licenses 16 by the trusted component 18 does not require that each found license 16 in fact be labeled as an un-chained license 16, a leaf license 16*l*, an intermediate license 16*i*, a root license 16*r*, or the like. Instead, it is typical in the present invention that: (1) a license 16 having a KID of a piece of content 12 and no uplink KID(x+1) is an un-chained license 16; (2) a license 16 having a KID of a piece of content 12 and an uplink KID(x+1) is a leaf license 16*l*; (3) a license 16 having a KIDx referenced by the uplink KID(x+1) of another license 16 and having an uplink KID(x+1) itself is an intermediate license 16*i*; and (4) a license 16 having a KIDx referenced by the uplink KID(x+1) of another license 16 and not having an uplink KID(x+1) itself is a root license 16*r*. Note though, that instances may exist where, for example, a license 16 may be both an intermediate license 16*i* with regard to some piece of content 12 and a leaf license 16*l* with regard to another piece of content 12. However, it is presently believed that such an instance is inadvisable as being both unnecessary and unduly confusing in operation.

As thus far set forth in the present disclosure, licenses 16 can be bound to one another in a linear fashion as a chain 24. However, it is to be appreciated that licenses 16 can also be bound to one another in a hierarchical fashion as a tree having a plurality of such chains 24. For example, in such tree case it may be that the KID of a particular root license 16*r* is the uplink KID of each of a plurality of intermediate licenses 16*i* at a first sub-level, that for each of the plurality of intermediate licenses 16*i* at the first sub-level, the KID thereof is the uplink KID of each of a plurality of intermediate licenses 16*i* at a second sub-level, and that for each of the plurality of intermediate licenses 16*i* at the second sub-level, the KID thereof is the uplink KID of each of a plurality of leaf licenses 16*l* at a third sub-level. Moreover, it may further be the case that there are additional leaf licenses 16*l* at any one of the first and second sub-levels with uplink KIDs referring to various intermediate licenses 16*i* at the first sub-level and the root license 16*r*, respectively. Notably, with respect to any leaf license 16*l* in such a hierarchical tree of licenses 16, a chain 24 of licenses 16 may still be found between such leaf license 16*l* and the root license 16*r* of such tree, and accordingly, the process set forth in connection with FIG. 5 may still be employed.

Moreover, it is to be appreciated that with a hierarchically organized tree of licenses 16, the rules set forth in the root license 16*r* of such tree must be satisfied and such root license 16*r* must verify in order to render any piece of content 12 bound to the tree. Similarly, for a sub-branch of a tree as represented by an intermediate license 16*i*, the rules set forth in such intermediate license 16*i* of such branch must be satisfied and such intermediate license 16*i* must verify in order to render any piece of content 12 bound to the branch. As a result, and as may be appreciated, a single license 16 in the tree may control rendering in connection with many leaf licenses 16*l* that branch out from such single license 16 within the tree. For example, revocation, expiration, and the like of such single license 16 in the tree would prevent any rendering in connection with such leaf licenses 16*l* that branch out from such single license 16 within the tree.

In one envisioned scenario, multiple leaf licenses 16*l* are bound either directly or indirectly to a root license 16*r* that expires monthly. Thus to enable a user to view content 12 bound to such leaf licenses 16*l*, such as for example content 12 organized into a library, a subscription service would re-issue the root license 16*r* each month to users who subscribe thereto. As should be evident, re-issuing the root license 16*r* is much simpler and faster than re-issuing every leaf license 16*l*.

Note that an instance may exist where, for example, a tree includes a cyclic or looping portion therein. While technically feasible, such as for example in an instance where a license 16 might include multiple uplink KIDs that are conditionally accessed, it is presently believed that such an instance is inadvisable as being both unnecessary and unduly confusing in construction and operation.

As may be appreciated in connection with the present invention, it would be useful to provide current license data during acquisition of a leaf license 16*l* or intermediate license 16*i* about other licenses 16 that may be in the chain 24 toward and including the root license 16*r* which are required to render the corresponding content 12. Likewise, the content 12 itself may have similar current license data. Such license data may comprise a list of KIDs/uplink KIDs. Based on such license data, a content protection system 10 and/or trusted component 18 thereof may issue license requests for required licenses 16 of the chain, as necessary. Such license data may also be useful during acquisition of a root license, perhaps to describe a tree of available intermediate and leaf licenses 16*i*, 16*l*, among other things.

CONCLUSION

The present invention may be practiced with regard to any appropriate content 12 and licenses 16 organized in any particular bound fashion. As should now be appreciated, with the present invention as set forth herein, rendering of content 12 may be controlled according to more than merely a single corresponding license 16, and in particular may be controlled based on a plurality of licenses 16, each of which must verify and be satisfied.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture or method that allow for binding a chained license 16 to another chained license 16, traversing from one chained license 16 to the next, and employing a chain 24 of chained licenses 16 to render content 12, among other things. It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A computer implemented method for rendering encrypted digital content on a computing device in accordance with a chain of licenses, each license in the chain of licenses having an associated set of rules that must be satisfied to allow the encrypted digital content to be rendered, the method comprising:

receiving a request to render the content, the content having a link identifier identifying a first license associated with the content;

locating the chain of licenses corresponding to the content, the chain including the first license linked to the content at one end of the chain, a root license at the other end of the chain not having a link identifier, and any intermediate licenses therebetween, the first license and any intermediate licenses in the chain each comprising a link identifier identifying the adjoining license in the chain toward the root license and the root license bound to an owner of a private key (PR-U), wherein locating the chain of licenses comprises:

identifying the link identifier associated with the content;

finding the first license on the computing device associated with the identified link identifier;

verifying the found first license and confirming that a rule associated with the first license permits the rendering of the content;

identifying that the found first license has an uplink identifier; and repeatedly:

finding an (x)th license on the computing device having the uplink content identifier of the found (x−1)th license;

verifying the found (x)th license and confirming that the found (x)th license permits the rendering of the content; and determining whether the found (x)th license has an uplink identifier;

until it is determined that the found (x)th license does not have an uplink identifier and is therefore the root license; and upon determining each license in the chain of licenses is verified and the rules of each license in the chain are satisfied, obtaining a cryptographic key for decrypting the content from the first license, comprising:

obtaining from the root license a link key $KL(x-1)$ of the adjoining (x−1)th license toward the first license encrypted according to a public key PU-U to result in $PU\text{-}U(KL(x-1))$;

applying a private key PR-U corresponding to PU-U to $PU\text{-}U(KL(x-1))$ to reveal $KL(x-1)$;

for each found license in the chain between the first license and the root license, and in order from the root license to the first license:

obtaining from the (x)th license a link key of the adjoining (x−1)th license toward the first license $KL(x-1)$ encrypted according to a link key of the (x)th license KLx to result in $KLx(KL(x-1))$; and applying KLx to $KLx(KL(x-1))$ to reveal $KL(x-1)$, KLx being revealed in connection with the (x+1)th license in the chain;

until KL1 is revealed;

obtaining from the first license a content key KD for decrypting the content encrypted according to KL1 to result in $KL1(KD)$; and applying KL1 to $KL1(KD)$ to reveal KD; and applying KD to the encrypted content to decrypt same.

2. The method of claim 1, wherein repeatedly:

finding an (x)th license on the computing device having the uplink content identifier of the found (x−1)th license;

verifying the found (x)th license and confirming that the found (x)th license permits the rendering of the content; and determining whether the found (x)th license has an uplink identifier;

until it is determined that the found (x)th license does not have an uplink identifier and is therefore the root license, comprises:

finding a second license on the computing device having the uplink identifier of the found first license;

verifying the found second license and confirming that the found second license permits the rendering of the content; and determining that the found second license does not have an uplink identifier and is therefore a root license.

3. The method of claim 1:

wherein repeatedly:

finding an (x)th license on the computing device having the uplink content identifier of the found (x−1)th license;

verifying the found (x)th license and confirming that the found (x)th license permits the rendering of the content; and determining whether the found (x)th license has an uplink identifier;

until it is determined that the found (x)th license does not have an uplink identifier and is therefore the root license, comprises:

finding a second license on the computing device having the uplink identifier ~ of the found first license;

verifying the found second license and confirming that the found second license permits the rendering of the content;

determining that the found second license has an uplink identifier;

finding a third license on the computing device having the uplink identifier of the found second license;

verifying the found third license and confirming that the found third license permits the rendering of the content;

determining that the found third license does not have an uplink identifier and is therefore a root license; and wherein, obtaining from the root license a link key KL(x−1) of the adjoining (x−1)th license toward the first license encrypted according to a public key PU-U to result in PU-U(KL(x−1)), comprises obtaining from the root license a link key of the second license (KL2)) encrypted according to a public key (PU-U) to result in (PU-U(KL2));

wherein applying a private key PR-U corresponding to PU-U to PU-U(KL(x−1)) to reveal KL(x−1) comprises applying a private key (PR-U) corresponding to (PU-U) to (PU-U(KL2)) to reveal (KL2)); and wherein for each found license in the chain between the first license and the root license, and in order from the root license to the first license:
  obtaining from the (x)th license a link key of the adjoining (x−1)th license toward the first license KL(x−1) encrypted according to a link key of the (x)th license KLx to result in KLx(KL(x−1)); and
  applying KLx to KLx(KL(x−1)) to reveal KL(x−1), KLx being revealed in connection with the (x+1)th license in the chain;
until KL1 is revealed, comprises:
  obtaining from the second license a link key of the first license (KL1)) encrypted according to (KL2) to result in (KL2(KL1)); and
  applying (KL2) to (KL2(KL1)) to reveal (KL1)).

4. The method of claim 1
wherein repeatedly:
  finding an (x)th license on the computing device having the uplink content identifier of the found (x−1)th license;
  verifying the found (x)th license and confirming that the found (x)th license permits the rendering of the content; and
  determining whether the found (x)th license has an uplink identifier;
until it is determined that the found (x)th license does not have an uplink identifier and is therefore the root license, comprises:
  finding a second license on the computing device having the uplink identifier of the found first license;
  verifying the found second license and confirming that the found second license permits the rendering of the content; and
  determining that the found second license has an uplink identifier;
  finding a third license on the computing device having the uplink identifier of the found second license;
  verifying the found third license and confirming that the found third license permits the rendering of the content;
  determining that the found third license has an uplink identifier;
  finding a fourth license on the computing device having the uplink identifier of the found third license;
  verifying the found fourth license and confirming that the found fourth license permits the rendering of the content;
  determining that the found fourth license does not have an uplink identifier and is therefore a root license;

wherein, obtaining from the root license a link key KL(x−1) of the adjoining (x−1)th license toward the first license encrypted according to a public key PU-U to result in PU-U(KL(x−1)), comprises obtaining from the root license a link key of the third license KL3) encrypted according to a public key PU-U to result in PU-U(KL3);

wherein applying a private key PR-U corresponding to PU-U to PU-U(KL(x−1)) to reveal KL(x−1) comprises applying a private key PR-U corresponding to PU-U to PU-U(KL3) to reveal KL3); and wherein for each found license in the chain between the first license and the root license, and in order from the root license to the first license:
  obtaining from the (x)th license a link key of the adjoining (x−1)th license toward the first license KL(x−1) encrypted according to a link key of the (x)th license KLx to result in KLx(KL(x−1)); and
  applying KLx to KLx(KL(x−1)) to reveal KL(x−1), KLx being revealed in connection with the (x+1)th license in the chain;
until KL1 is revealed, comprises:
  obtaining from the third license a link key of the second license KL2) encrypted according to KL3 to result in KL3(KL2);
  applying (KL3) to KL3(KL2) to reveal KL2);
  obtaining from the second license a link key of the first license KL1) encrypted according to KL2 to result in KL2(KL1); and
  applying KL2 to KL2(KL1) to reveal KL1).

5. The method of claim 1
wherein repeatedly:
  finding an (x)th license on the computing device having the uplink content identifier of the found (x−1)th license;
  verifying the found (x)th license and confirming that the found (x)th license permits the rendering of the content; and
  determining whether the found (x)th license has an uplink identifier;
until it is determined that the found (x)th license does not have an uplink identifier and is therefore the root license, comprises:
  finding a second license on the computing device having the uplink of the found first license;
  verifying the found second license and confirming that the found second license permits the rendering of the content;
  determining that the found second license has an uplink;
  finding a third license on the computing device having the uplink of the found second license;
  verifying the found third license and confirming that the found third license permits the rendering of the content;
  determining that the found third license has an uplink;
  finding a fourth license on the computing device having the uplink of the found third license;
  verifying the found fourth license and confirming that the found fourth license permits the rendering of the content;
  determining that the found fourth license has an uplink;
  finding a fifth license on the computing device having the uplink of the found fourth license;
  verifying the found fifth license and confirming that the found fifth license permits the rendering of the content;

determining that the found fifth license does not have an uplink and is therefore a root license;

wherein, obtaining from the root license a link key $KL(x-1)$ of the adjoining $(x-1)$th license toward the first license encrypted according to a public key PU-U to result in $PU\text{-}U(KL(x-1))$, comprises obtaining from the root license a link key of the fourth license $KL4)$ encrypted according to a public key PU-U to result in $PU\text{-}U(KL4)$;

wherein applying a private key PR-U corresponding to PU-U to $PU\text{-}U(KL(x-1))$ to reveal $KL(x-1)$ comprises applying a private key PR-U corresponding to PU-U to $PU\text{-}U(KL4)$ to reveal $KL4)$; and wherein for each found license in the chain between the first license and the root license, and in order from the root license to the first license:
  obtaining from the $(x)$th license a link key of the adjoining $(x-1)$th license toward the first license $KL(x-1)$ encrypted according to a link key of the $(x)$th license $KLx$ to result in $KLx(KL(x-1))$; and
  applying $KLx$ to $KLx(KL(x-1)$ to reveal $KL(x-1)$, $KLx$ being revealed in connection with the $(x+1)$th license in the chain;
until $KL1$ is revealed, comprises:
  obtaining from the fourth third license a link key of the third license $(KL3))$ encrypted according to $(KL4)$ to result in $(KL4(KL3))$;
  applying $(KL4)$ to $(KL4(KL3))$ to reveal $(KL3))$;
  obtaining from the third license a link key of the second license $(KL2))$ encrypted according to $(KL3)$ to result in $(KL3(KL2))$;
  applying $(KL3)$ to $(KL3(KL2))$ to reveal $(KL2))$;
  obtaining from the second license a link key of the first license $(KL1))$ encrypted according to $(KL2)$ to result in $(KL2(KL1))$;
  applying $(KL2)$ to $(KL2(KL1))$ to reveal $(RL1))$.

6. A computer readable storage medium comprising computer executable instructions for performing a computer implemented method for rendering encrypted digital content on a computing device in accordance with a chain of licenses, each license in the chain of licenses having an associated set of rules that must be satisfied to allow the encrypted digital content to be rendered, the method comprising:
  a) receiving a request to render the content;
  b) identifying a leaf license in the chain of licenses, the leaf license associated with the content;
  c) verifying the leaf license and determining whether the set of rules associated with the leaf license are satisfied;
  d) if the set of rules associated with the leaf license are satisfied, determining an uplink associated with the leaf license;
  e) identifying a next license in the chain of licenses based on the uplink, the identified next license becoming the current license;
  f) verifying the current license and determining whether the set of rules associated with the current license are satisfied;
  g) if the set of rules associated with the current license are satisfied, determining whether the current license comprises an uplink;
  h) if the current license comprises an uplink, identifying a next license in the chain of licenses associated with the uplink, the identified next license becoming the current license, and repeating steps f) through h) until the identified license does not comprise an uplink;
  i) if the current license does not comprises an uplink, identifying the current license as the root license, obtaining from the root license an encrypted license key comprising a license key encrypted with a public key, obtaining a private key paired to the public key, decrypting the encrypted license key to obtain the license key, the license key comprising a key for decrypting an encrypted license key in the previously chained license in the license chain in the direction from the root license to the leaf license to generate a decrypted license key, the decrypted license key becoming the current license key, and until the current license comprises the leaf license repeatedly obtaining the encrypted license key from the previously chained license in the license chain in the direction from the root license to the leaf license wherein the previously chained license becomes the current license and decrypting the encrypted license key using the current license key to obtain the license key for the previously chained license wherein the obtained license key becomes the current license key, and
  j) obtaining from the leaf license an encrypted content key comprising a content key encrypted with the current license key;
  k) decrypting the encrypted content key using the current license key to render the content key; and
  l) decrypting the encrypted digital content using the content key to render the content.

7. A system adapted for rendering encrypted digital content in accordance with a chain of licenses, each license in the chain of licenses having an associated set of rules that must be satisfied to allow the encrypted digital content to be rendered, the system comprising:
  a computing processor; and
  memory communicatively coupled with the computing processor, the memory having stored therein instructions executable by the computing processor to perform the following:
  receiving a request to render the content, the content having a link identifier identifying a first license associated with the content;
  locating the chain of licenses corresponding to the content, the chain including a first license linked to the content at one end of the chain, a root license at the other end of the chain not having a link identifier, and any intermediate licenses therebetween, the first license and any intermediate licenses in the chain each comprising a link identifier identifying the adjoining license in the chain toward the root license and the root license bound to an owner of a private key (PR-U), wherein locating the chain of licenses comprises:
    identifying the link identifier associated with the content;
    finding the first license on the computing device associated with the identified link identifier;
    verifying the found first license and confirming that a rule associated with the first license permits the rendering of the content;
    identifying that the found first license has an uplink identifier; and
    repeatedly:
      finding an $(x)$th license on the computing device having the uplink content identifier of the found $(x-1)$th license;
      verifying the found $(x)$th license and confirming that the found $(x)$th license permits the rendering of the content; and
      determining whether the found $(x)$th license has an uplink identifier;

until it is determined that the found (x)th license does not have an uplink identifier and is therefore the root license; and upon determining each license in the chain of licenses is verified and the rules of each license in the chain are satisfied, obtaining a cryptographic key for decrypting the content from the first license, obtaining from the root license a link key KL(x−1) of the adjoining (x−1)th license toward the first license encrypted according to a public key PU-U to result in PU-U(KL(x−1));

applying a private key PR-U corresponding to PU-U to PU-U(RL(x−1)) to reveal KL(x−1);

for each found license in the chain between the first license and the root license, and in order from the root license to the first license:

obtaining from the (x)th license a link key of the adjoining (x−1)th license toward the first license KL(x−1) encrypted according to a link key of the (x)th license KLx to result in KLx(KL(x−1)); and applying KLx to KLx(KL(x−1)) to reveal KL(x−1), KLx being revealed in connection with the (x+1)th license in the chain;

until KL1 is revealed;

obtaining from the first license a content key KD for decrypting the content encrypted according to KL1 to result in KL1(KD);

applying KL1 to KL1(KD) to reveal KD; and applying the obtained key to the encrypted content to decrypt same and rendering the decrypted content.

* * * * *